United States Patent
Zhou et al.

(10) Patent No.: US 11,933,737 B2
(45) Date of Patent: Mar. 19, 2024

(54) DETECTION DEVICE AND METHOD FOR DETECTING WORKPIECE

(71) Applicants: Tyco Electronics (Shanghai) Co. Ltd, Shanghai (CN); TE Connectivity Services GmbH, Schaffhausen (CH); Tyco Electronics AMP Guangdong Ltd, Foshan (CN)

(72) Inventors: Lei (Alex) Zhou, Shanghai (CN); Dandan (Emily) Zhang, Shanghai (CN); Roberto Francisco-Yi Lu, Bellevue, WA (US); Yanlin Huang, Foshan (CN); Yangqin Ma, Foshan (CN); Wei Yang, Foshan (CN); Guishou Chen, Foshan (CN); Ming Yang, Foshan (CN); Yuanyi Zhao, Foshan (CN)

(73) Assignees: Tyco Electronics AMP Guangdong Ltd., Forshan (CN); TE Connectivity Solutions GmbH, Schaffhausen (CH); Tyco Electronics (Shanghai) Co., Ltd., Shanghai (CN)

( * ) Notice: Subject to any disclaimer, the term of this patent is extended or adjusted under 35 U.S.C. 154(b) by 17 days.

(21) Appl. No.: 17/747,475

(22) Filed: May 18, 2022

(65) Prior Publication Data
US 2022/0373471 A1    Nov. 24, 2022

(30) Foreign Application Priority Data
May 21, 2021 (CN) .......................... 202110562053.2

(51) Int. Cl.
*G01N 21/88* (2006.01)
*B23Q 7/02* (2006.01)

(52) U.S. Cl.
CPC ........... *G01N 21/8806* (2013.01); *B23Q 7/02* (2013.01); *G01N 21/8851* (2013.01)

(58) Field of Classification Search
CPC ........... G01N 21/8806; G01N 21/8851; G01N 2021/887; B23Q 7/02; B23Q 2220/004; B23Q 17/249; B23Q 17/2471; G01B 11/02; G01B 11/24
See application file for complete search history.

(56) References Cited

U.S. PATENT DOCUMENTS

| | | | | |
|---|---|---|---|---|
| 8,737,719 B2 * | 5/2014 | Tsumura | ............... | H01L 21/681 382/151 |
| 10,651,095 B2 * | 5/2020 | Jadhav | ................... | H04N 23/69 |
| 11,022,560 B2 * | 6/2021 | Kato | ...................... | H04N 23/90 |
| 2020/0275030 A1 * | 8/2020 | Wang | ..................... | H04N 23/54 |

* cited by examiner

*Primary Examiner* — Hung V Nguyen
(74) *Attorney, Agent, or Firm* — Barley Snyder

(57) ABSTRACT

A detection device for detecting a workpiece with multiple surfaces includes a rotary table carrying the workpiece and moving the workpiece by rotation and a plurality of photographing devices arranged at a plurality of different positions around the rotary table. Each photographing device has an image capture device capturing an image of a corresponding surface of the workpiece that is moved to the image capture device. An orientation of the image capture device is defined by a first offset angle and a second offset angle when the image capture device captures the image of the corresponding surface of the workpiece.

20 Claims, 11 Drawing Sheets

DETECTION DEVICE AND METHOD FOR DETECTING WORKPIECE

CROSS-REFERENCE TO RELATED APPLICATIONS

This application claims the benefit of the filing date under 35 U.S.C. § 119(a)-(d) of Chinese Patent Application No. 202110562053.2, filed on May 21, 2021.

FIELD OF THE INVENTION

The present invention relates to workpiece detection and, in particular, to a detection device and a method for detecting a workpiece by using the detection device.

BACKGROUND

In the process of workpiece manufacturing, it is often necessary to detect the workpiece. For example, the surface image of the workpiece is obtained by camera to detect the size and surface defects of the workpiece. However, the workpiece usually has multiple surfaces, and the existing detection devices can only detect one surface of the workpiece at a time, not multiple surfaces at one time, and thus the detection efficiency is low. Therefore, detecting multiple surfaces of workpieces quickly and efficiently has become a major problem in the industry. In addition, when the existing detection device meets the focal distance between the camera and the workpiece, the overall size is usually large, which is not conducive to saving space.

SUMMARY

A detection device for detecting a workpiece with multiple surfaces includes a rotary table carrying the workpiece and moving the workpiece by rotation and a plurality of photographing devices arranged at a plurality of different positions around the rotary table. Each photographing device has an image capture device capturing an image of a corresponding surface of the workpiece that is moved to the image capture device. An orientation of the image capture device is defined by a first offset angle and a second offset angle when the image capture device captures the image of the corresponding surface of the workpiece.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
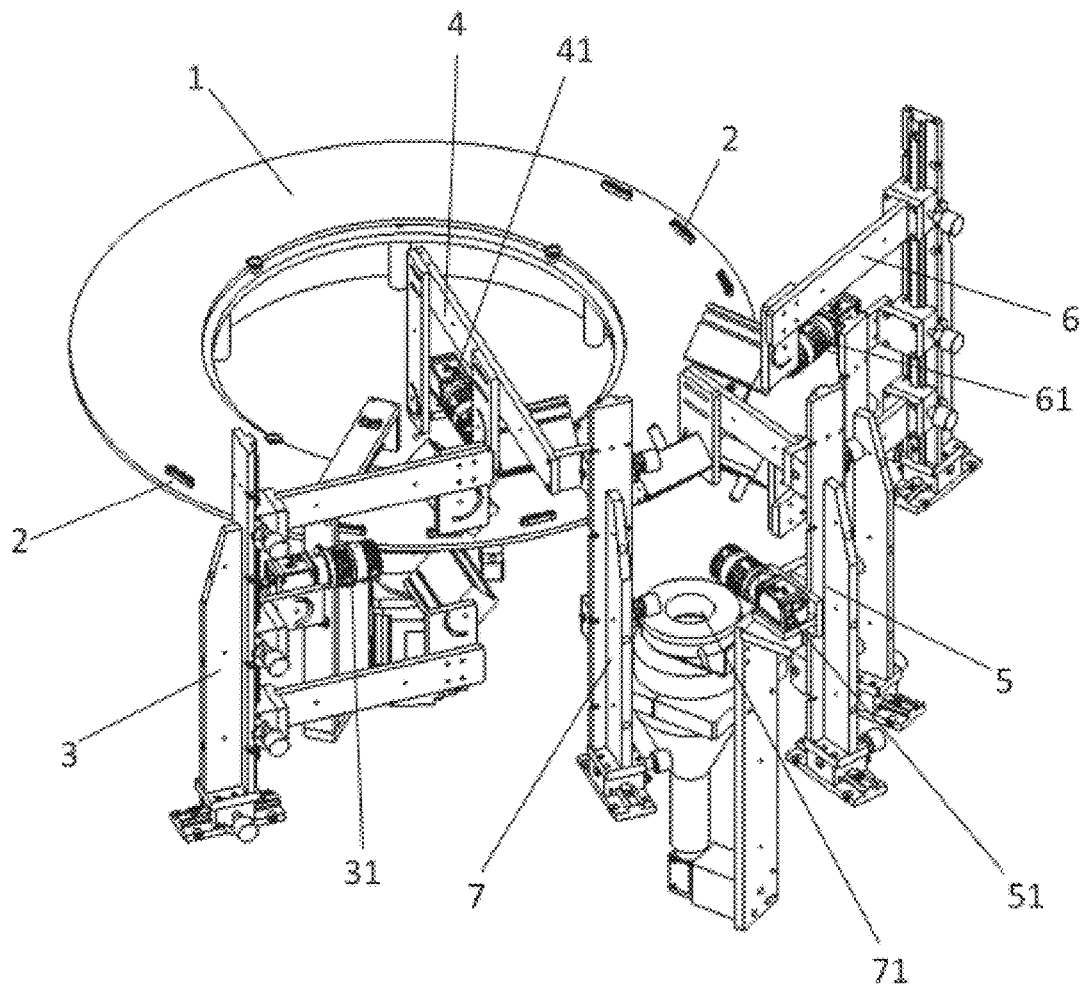
FIG. 1 is a perspective view of a detection device according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide an understanding of the disclosed embodiments. It will be apparent, however, that one or more embodiments may be practiced without these specific details. In other instances, well-known structures and devices are schematically shown in order to simplify the drawing.

Unless otherwise defined, the technical terms or scientific terms used in the invention shall have the general meaning understood by those with general skills in the field to which the invention belongs. "First", "second" and similar words used in the invention do not mean any order, quantity or importance, but are only used to distinguish different components. The wording "one" does not exclude more than one. Similar words such as "including" mean that the elements or objects appearing before the word cover the elements or objects listed after the word and their equivalents, and do not exclude other elements or objects. Similar words such as "connection" or "connection" are not limited to physical or mechanical connection, but can include electrical connection, whether direct or indirect. "Up", "down", "left", "right", "top" or "bottom" are only used to represent the relative positional relationship. When the absolute position of the described object changes, the relative positional relationship may also change accordingly. When an element is said to be "up" or "down" on another element, the element can be "directly" on "or" down "on another element, or there can be intermediate elements.

As shown in FIGS. 1 to 11(c), the embodiment of the present invention provides a detection device. The detection device includes a rotary table 1 and a plurality of photographing devices 3, 4, 5 and 6. The rotary table 1 is configured to carry the workpiece 2 and drive the workpiece 2 through a plurality of photographing devices 3, 4, 5 and 6 in turn during rotation. The plurality of photographing devices 3, 4, 5 and 6 are successively arranged at different positions around the rotary table 1. This arrangement enables different photographing devices 3, 4, 5, 6 to work independently at different positions without affecting each other, especially avoiding the influence of lighting at different positions.

Each photographing device 3, 4, 5, 6 includes image capture devices 31, 41, 51 and 61, each of which is configured to capture an image of a corresponding surface of the workpiece 2 when the workpiece 2 is moved to the image capture device 31, 41, 51 and 61. An orientation of the image capture device 31, 41, 51 and 61 is defined by a first offset angle and a second offset angle when the image capture device 31, 41, 51, 61 captures the image of the corresponding surface of the workpiece 2. The first offset angle refers to an angle between a normal direction of the corresponding surface and an orthographic projection of an optical axis of the image capture device 31, 41, 51 and 61 on a plane perpendicular to a rotation axis of the rotary table 1. The second offset angle refers to an angle between a normal direction of the corresponding surface and an orthographic projection of the optical axis of the image capture device 31, 41, 51 and 61 on a plane parallel to the rotation axis of the rotary table 1 and perpendicular to the corresponding surface.

Next, taking the workpiece as a cuboid shape as an example, and referring to the drawings, the structure of the detection device for detecting the workpiece with multi surfaces is described in detail.

Figure 2:
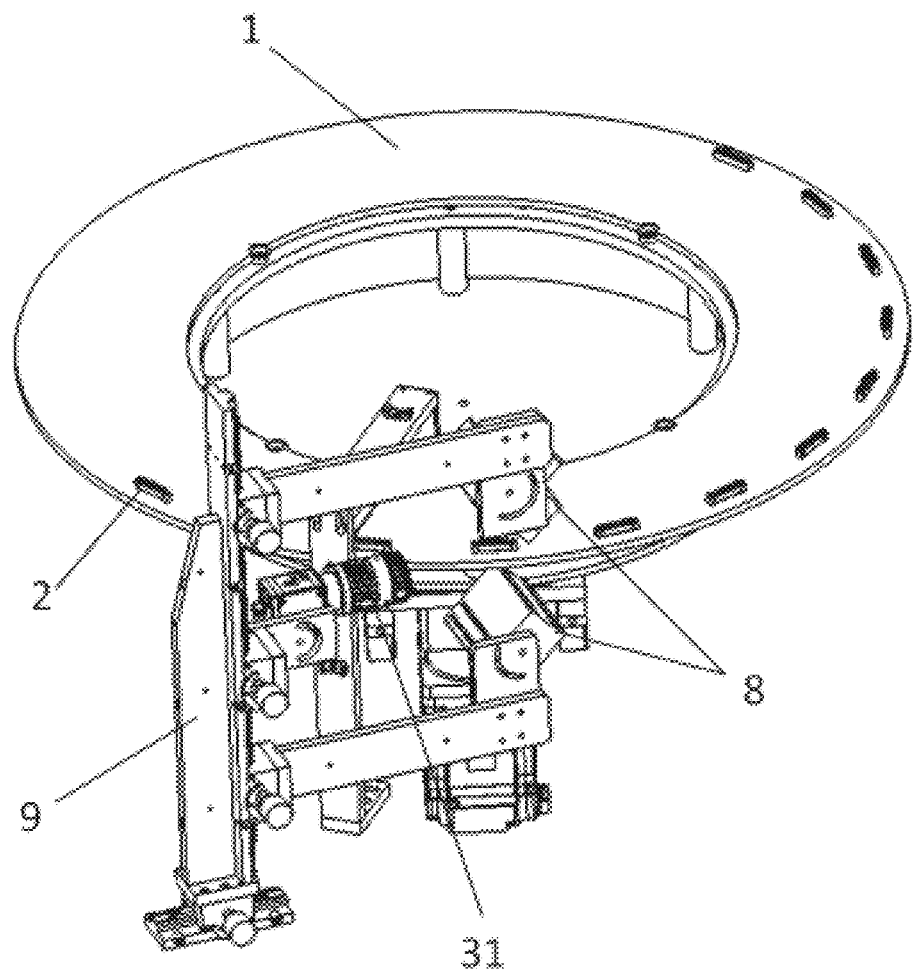
FIG. 2 is a perspective view of a first side surface photographing device according to an embodiment.
Figure 3A:
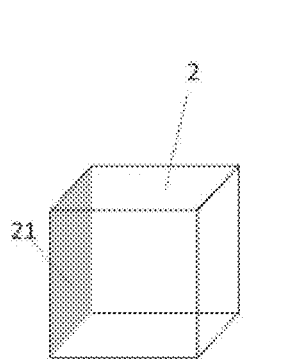
FIG. 3(a) is a schematic diagram of a first side surface to be photographed.
Figure 3B:
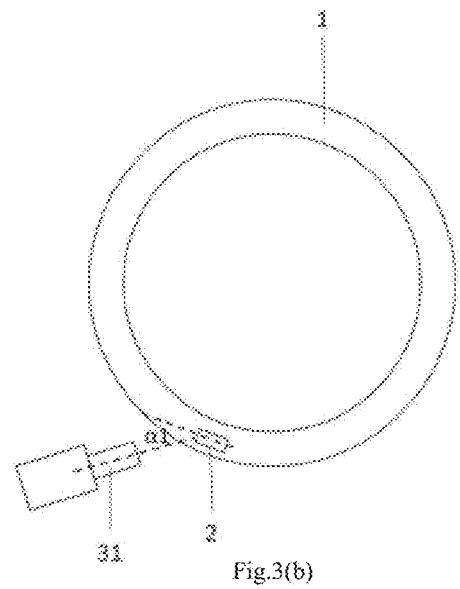
FIG. 3(b) is a schematic top view when the first side surface is photographed.
Figure 3C:
FIG. 3(c) is a schematic side view when the first side surface is photographed.

As shown in FIG. 2, one of the plurality of photographing devices 3, 4, 5 and 6 is the first side surface photographing device 3, and the image capture device of the first side surface photographing device 3 is the first side surface camera 31. The first side surface camera 31 is located outside the rotary table 1 and higher than the workpiece 2 in the direction perpendicular to the rotary table 1. The surfaces of the workpiece 2 include a first side surface 21. As shown in FIG. 3(a), the first side surface camera 31 is configured to capture an image of the first side surface 21 of the workpiece 2 in the rotation direction when the workpiece 2 is moved to the first side surface camera 31. Further, as shown in FIG. 3(b) to FIG. 3(c), the first offset angle α1 and second offset angle α2 can be greater than 0 degrees and less than or equal to 30 degrees.

Figure 4:
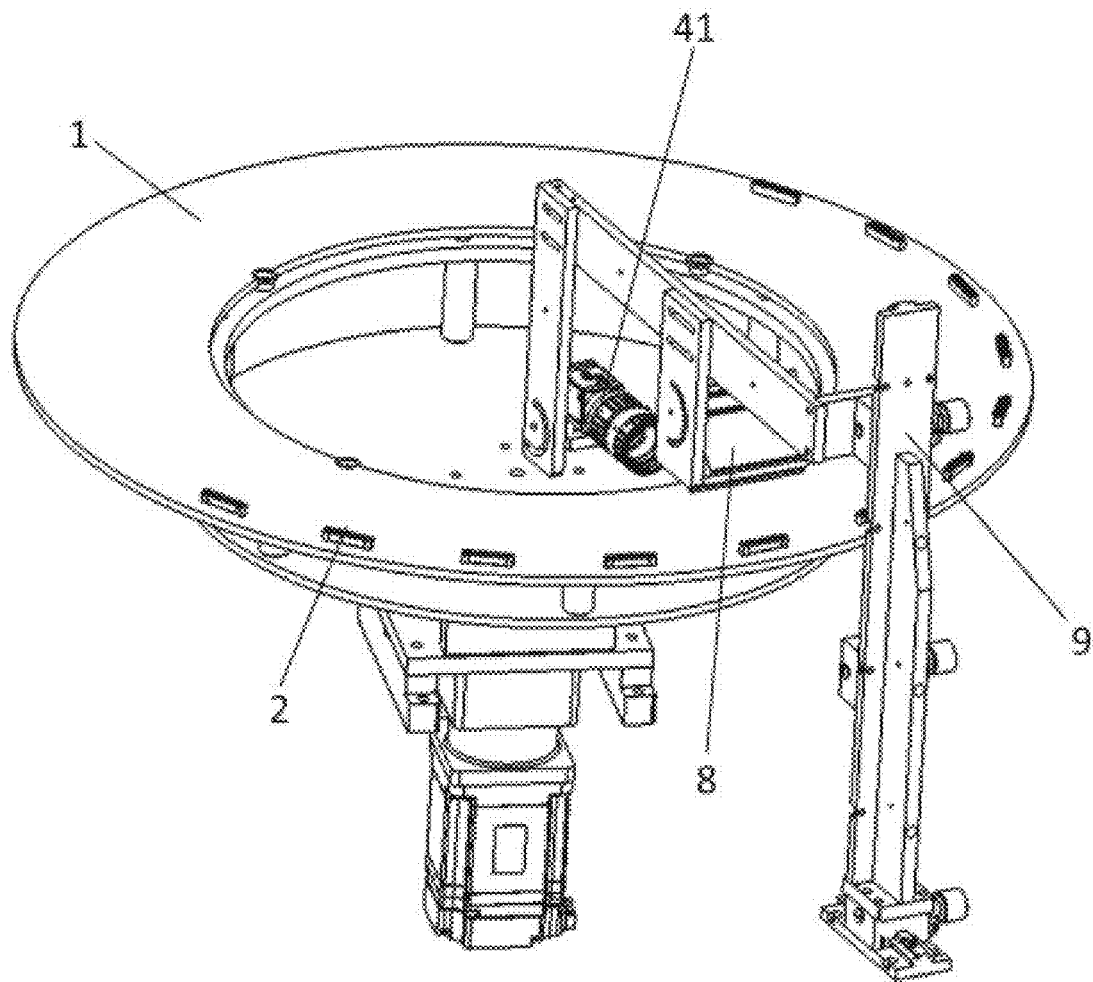
FIG. 4 is a perspective view of a second side surface photographing device according to an embodiment.
Figure 5A:
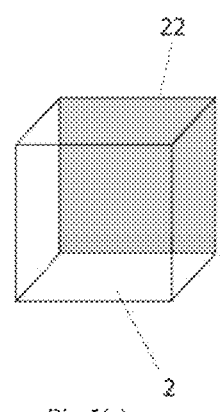
FIG. 5(a) is a schematic diagram of a second side surface to be photographed.
Figure 5B:
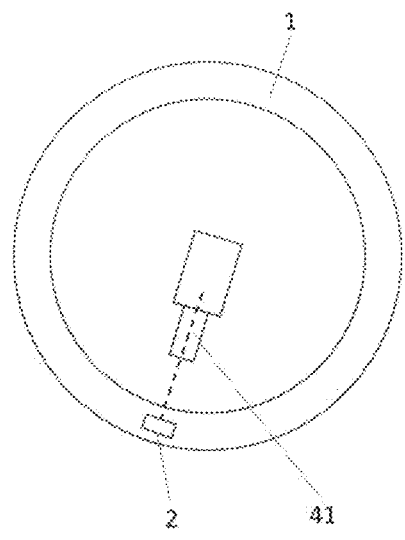
FIG. 5(b) is a schematic top view when the second side surface is photographed.
Figure 5C:
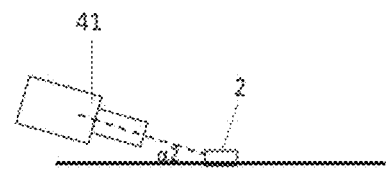
FIG. 5(c) is a schematic side view when the second side surface is photographed.

As shown in FIG. 4, one of the plurality of photographing devices 3, 4, 5 and 6 is the second side surface photographing device 4, and the image capture device of the second side surface photographing device 4 is the second side surface camera 41. The second side surface camera 41 is located at the inner side of the rotary table 1 and higher than the workpiece 2 in the direction perpendicular to the rotary table 1. The surfaces of the workpiece 2 include a second side surface 22 facing the center of the rotary table 1. As shown in FIG. 5(a), the second side surface camera 41 is configured to capture an image of the second side surface 22 facing the center of the rotary table 1 when the workpiece 2 is moved to the second side surface camera 41. Further, as shown in FIG. 5(b) to FIG. 5(c), the first offset angle α1 is 0 degrees, and the second offset angle α2 is greater than 0 degrees and less than or equal to 30 degrees.

Figure 6:
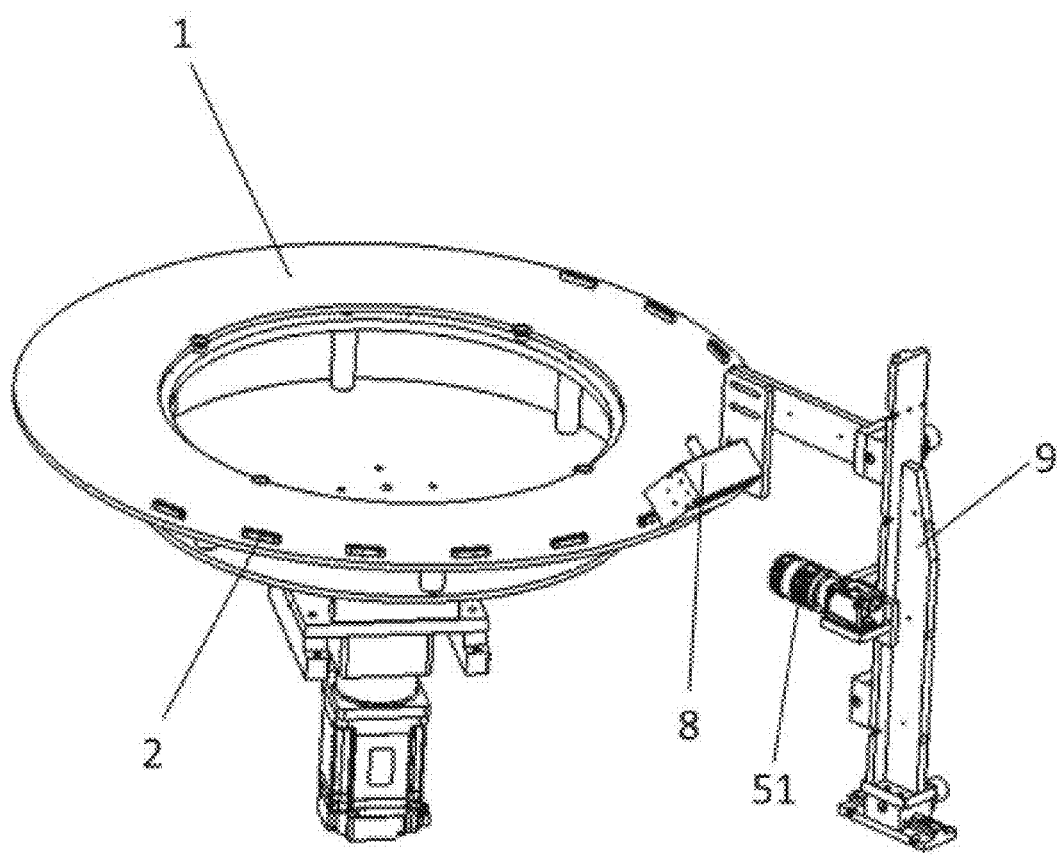
FIG. 6 is a perspective view of a third side surface photographing device according to an embodiment.
Figures 7A, 7B, 7C:
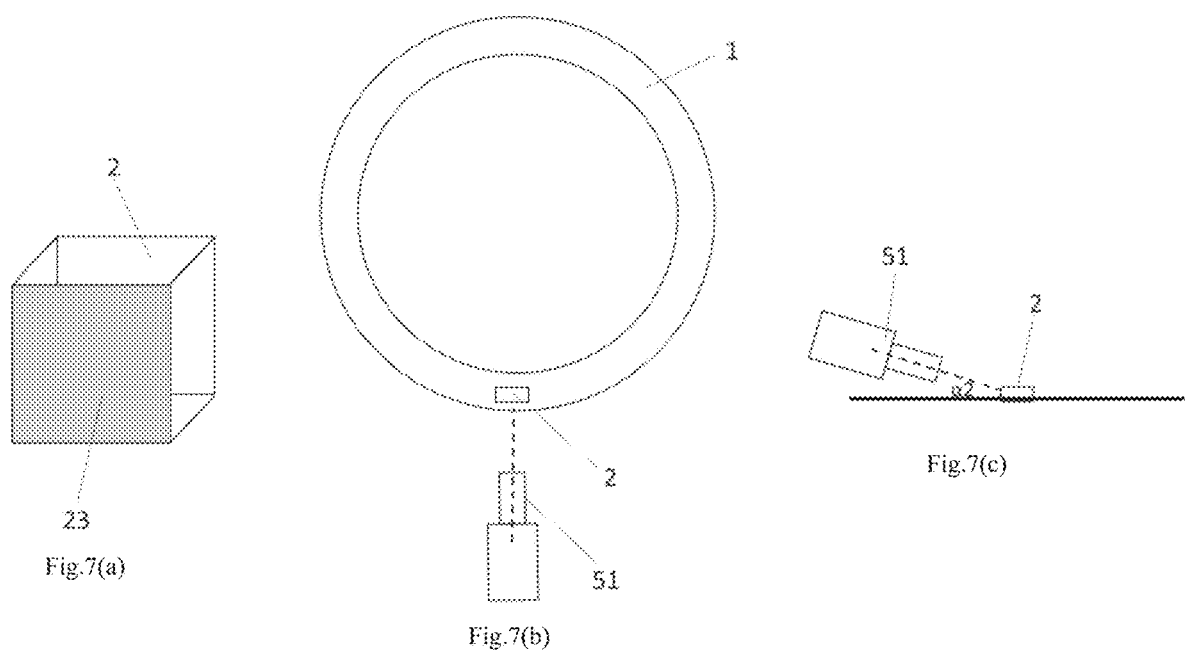
FIG. 7(a) is a schematic diagram of a third side surface to be photographed.
FIG. 7(b) is a schematic top view when the third side surface is photographed.
FIG. 7(c) is a schematic side view when the third side surface is photographed.

As shown in FIG. 6, one of the plurality of photographing devices 3, 4, 5 and 6 is the third side surface photographing device 5, and the image capture device of the third side surface photographing device 5 is the third side surface camera 51. The third side surface camera 51 is located outside the rotary table 1 and higher than the workpiece 2 in a direction perpendicular to the rotary table 1. The surfaces of the workpiece 2 include a third side surface 23 away from the center of the rotary table 1. As shown in FIG. 7(a), the third side surface camera 51 is configured to capture an image of the third side surface 23 of the workpiece 2 away from the center of the rotary table 1 when the workpiece 2 is moved to the third side surface camera 51. Further, as shown in FIG. 7(b) and FIG. 7(c), the first offset angle α1 is 0 degrees, second offset angle α2 is greater than 0 degrees and less than or equal to 30 degrees.

Figure 8:
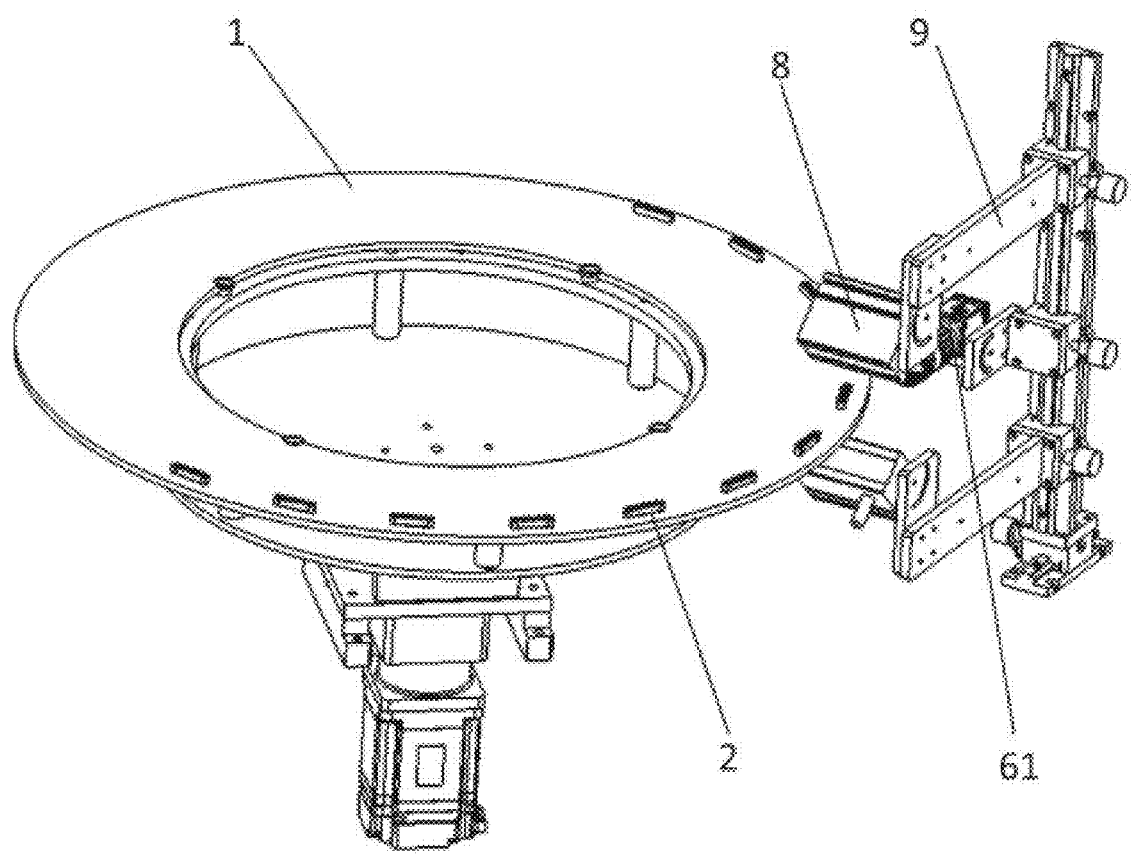
FIG. 8 is a perspective view of a fourth side surface photographing device according to an embodiment.
Figures 9A, 9B, 9C:
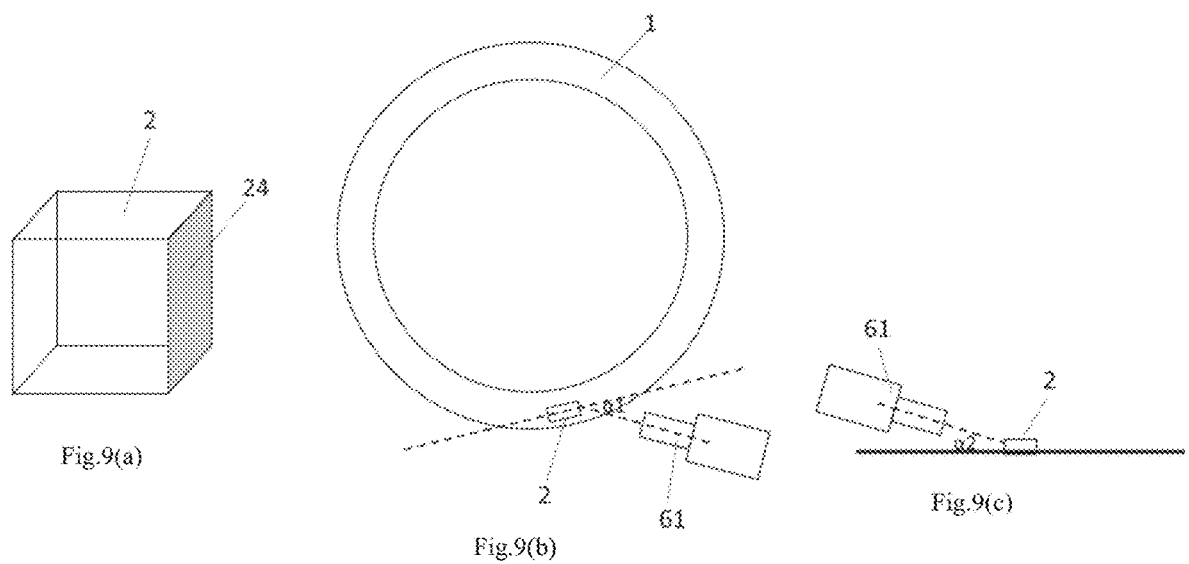
FIG. 9(a) is a schematic diagram of a fourth side surface to be photographed.
FIG. 9(b) is a schematic top view when the fourth side surface is photographed.
FIG. 9(c) is a schematic side view when the fourth side surface is photographed.

As shown in FIG. 8, one of the plurality of photographing devices 3, 4, 5 and 6 is the fourth side surface photographing device 6, and the image capture device of the fourth side surface photographing device 6 is the fourth side surface camera 61. The fourth side surface camera 61 is located outside the rotary table 1 and higher than the workpiece 2 in a direction perpendicular to the rotary table 1. The surfaces the workpiece 2 includes a fourth side surface 24 opposite to the first side surface 21 in the rotation direction. As shown in FIG. 9(a), the fourth side surface camera 61 is configured to capture an image of the fourth side surface 24 of the workpiece 2 in the rotation direction when the workpiece 2 is moved to the fourth side surface camera 61. Further, as shown in FIG. 9(b) and FIG. 9(c), the first offset angle α1 and second offset angle α2 can be greater than 0 degrees and less than or equal to 30 degrees.

Figure 10:
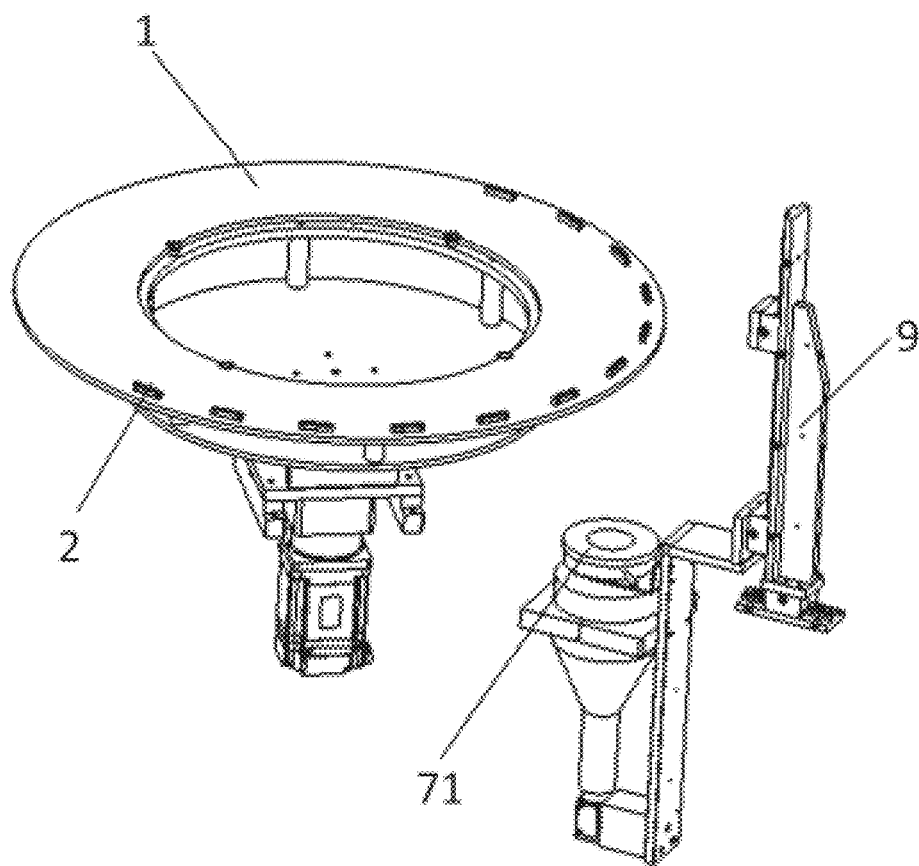
FIG. 10 is a perspective view of a top/bottom surface photographing device according to an embodiment.

As shown in FIG. 10, the detection device may also include a top/bottom surface photographing device 7 which includes a top/bottom surface camera 71. The top/bottom surface camera 71 is located above or below the rotary table 1. The top/bottom surface camera 71 is configured to capture an image of the top/bottom surface 25 of the workpiece 2 when the workpiece 2 is moved to the top/bottom surface camera 71.

Figure 11A:
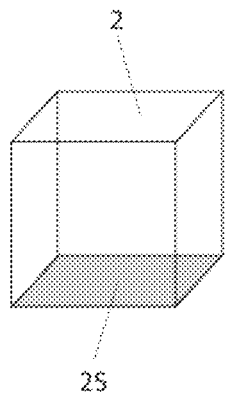
FIG. 11(a) is a schematic diagram of a top/bottom surface to be photographed.
Figure 11B:
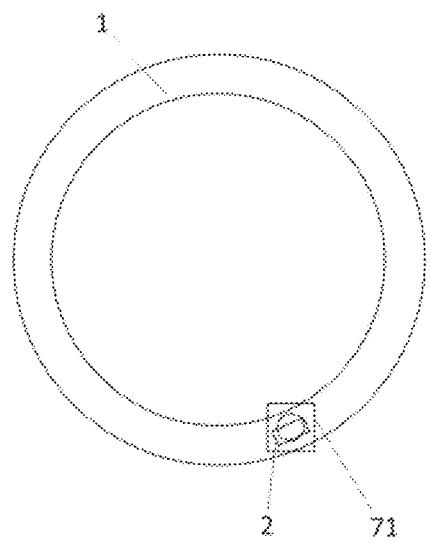
FIG. 11(b) is a schematic top view when the top/bottom side surface is photographed.
Figure 11C:
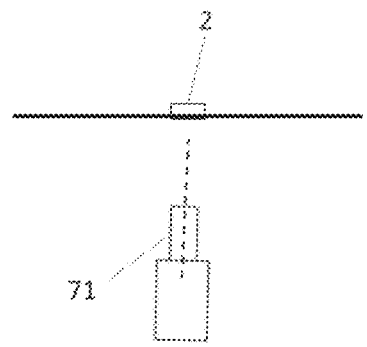
FIG. 11(c) is a schematic side view when the top/bottom side surface is photographed.

The top/bottom surface is the surface of the workpiece 2 facing or opposite to the rotary table 1. As shown in FIG. 11(a), the detection device includes the bottom surface photographing device 7. An orientation of the top/bottom surface camera 71 is defined by a third offset angle and a fourth offset angle when the top/bottom surface camera 71 captures the image of the top/bottom surface of the workpiece 2. The third offset angle refers to an angle between a normal direction of the top/bottom surface and an orthographic projection of an optical axis of the top/bottom surface camera 71 in a first reference plane parallel to a rotation axis of the rotary table 1 and perpendicular to the top/bottom surface 25. The fourth offset angle refers to an angle between the normal direction of the top/bottom surface and an orthographic projection of an optical axis of the top/bottom surface camera 71 on a second reference plane which is parallel to the rotation axis of the rotary table 1, perpendicular to the top/bottom surface 25, and perpendicular to the first reference plane. In an embodiment, the third offset angle and the fourth offset angle may be greater than or equal to 0 degrees and less than or equal to 30 degrees. For example, as shown in FIG. 11(b) and FIG. 11(c), the third offset angle and the fourth offset angle of the embodiment are both 0 degrees.

In addition, as shown in the aforementioned drawings, each photographing device also includes a light source 8 and a support 9, the light source 8 is used to provide illumination for the corresponding surface of the workpiece 2. The light source 8 and the image capture device 31, 41, 51 and 61 are installed on the support 9. The supports 9 of two adjacent photographing devices can be independent of each other or connected to each other. In this embodiment, as shown in FIG. 1, two adjacent supports 9 are actually connected with each other, and each support 9 is staggered with intervals to avoid the interaction between different light sources 8.

As can be seen from FIG. 1, the plurality of photographing assemblies 3, 4, 5 and 6 and the top/bottom surface photographing device 7 are distributed within a half cycle of rotation of the rotary table 1, so that the rotary table 1 can complete the photographing and detection of multiple surfaces of a workpiece 2 only by rotating for half a cycle, so the detection efficiency is further improved.

In addition, the rotary table 1 is made of transparent material. The embodiment does not make specific restrictions on the driving mode of the rotary table 1, and the conventional driving mode in the art can be used to drive the rotary table 1. Similarly, the embodiment does not make special selection for the image capture device, but can select the common image capture device in the art. For example, the embodiment can select the camera with a prominent lens, and the operation of the camera can also refer to the conventional operation mode in the art.

In an embodiment, the plurality of photographing devices may include a first side surface photographing device 3, an second side surface photographing device 4, a top/bottom surface photographing device 7, an third side surface photographing device 5 and a fourth side surface photographing device 6 arranged successively along the rotation direction of the rotary table 1, which are located at five positions respectively. Accordingly, the first side surface 21 of the workpiece 2 in the rotation direction of the rotary table, the second side surface 22 facing the center of the rotary table, the top/bottom surface 25, the third side surface 23 away from the center of the rotary table, and the fourth side surface 24 in the rotation direction are detected at these five positions. The above five photographing devices are only examples, and the invention can increase or decrease the photographing devices according to the specific photographing requirements.

In addition, the embodiment also provides a method for detecting a workpiece using the detection device. The method comprises the following steps:

providing the above detection device;

placing the workpiece 2 on the rotary table 1 and rotating the rotary table 1 so that the workpiece 2 passes through the plurality of photographing devices 3, 4, 5, 6 in turn;

capturing images of the side surfaces of the workpiece 2 by the image capture devices of the plurality of photographing devices, respectively; and recording the first offset angle and the second offset angle while the image capture device captures the image of the corresponding side surface.

Due to the existence of the first offset angle and the second offset angle, the size of the captured image of the surface is not necessarily equal to the actual size of the surface, so it is necessary to convert the image size into the actual size of the surface by calculation. For example, when the workpiece 2 is a cuboid, the method also includes a following step:

calculating the size of the corresponding side surface by a following formula:

$$E_1 = \frac{e_1}{\cos\alpha 1} \tag{1}$$

wherein E1 is the length of one edge of the corresponding side surface, and e1 is the length of the image of the one edge, α1 is the first offset angle;

$$E_2 = \frac{e_2}{\cos\alpha 2} \tag{2}$$

wherein E2 is the length of the other edge adjacent to the one edge of the corresponding side surface, and e2 is the length of the image of the other edge, α2 is the second offset angle.

Further, the diagonal length d of the corresponding surface can also be calculated by the following formula (3):

$$D=\sqrt{E_1^2+E_2^2} \tag{3}$$

It should be noted that the existing detection device usually arranges the camera parallel to the rotary table. In order to meet the focal distance between the camera and the rotary table, the camera has to be arranged at a relatively long distance outside the rotary table, which will lead to the increase of the working space and overall size of the whole detection device, which is not conducive to saving space. The invention reasonably sets the above offset angle and changes the camera 31, 41, 51, 61 from a long distance outside the rotary worktable 1 to a certain distance above (or below) the rotary worktable 1, which undoubtedly reduces the extension distance of the whole detection equipment in the horizontal direction, thus reducing the overall size and greatly saving space. In addition, the existing detection device takes each directly against the surface of the workpiece, which inevitably brings background noise to the captured image. By setting the offset angle, the invention can avoid the background noise to a certain extent.

In short, the detection device of the embodiment enables the workpiece 2 to move continuously in the rotary table 1, and can detect multiple surfaces of the workpiece 2 at one time. As shown in FIG. 1, it can also carry out batch detection for multiple workpieces 2, which greatly improves the detection efficiency; Moreover, the detection device of the embodiment avoids the influence of lighting between different positions, reduces the background noise, reduces the size of the whole detection device, and saves the working space.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A detection device for detecting a workpiece with multiple surfaces, comprising:
   a rotary table carrying the workpiece and moving the workpiece by rotation; and
   a plurality of photographing devices arranged at a plurality of different positions around the rotary table, each photographing device has an image capture device capturing an image of a corresponding surface of the workpiece that is moved to the image capture device, an orientation of the image capture device is defined by a first offset angle and a second offset angle when the image capture device captures the image of the corresponding surface of the workpiece, the first offset angle is an angle of no less than 0 degrees and no larger than 30 degrees between a normal direction of the corresponding surface and an orthographic projection of an optical axis of the image capture device on a plane perpendicular to a rotation axis of the rotary table, the second offset angle is an angle of no less than 0 degrees and no larger than 30 degrees between the normal direction of the corresponding surface and an orthographic projection of the optical axis of the image capture device on a plane parallel to the rotation axis of the rotary table and perpendicular to the corresponding surface.

2. The detection device of claim 1, wherein the multiple surfaces of the workpiece include a first side surface and a fourth side surface opposite to each other in a rotation direction of the rotary table, and a second side surface and a third side surface opposite to each other in a radial direction of the rotary table.

3. The detection device of claim 2, wherein the plurality of photographing devices include a first side surface photographing device, the image capture device of the first side surface photographing device is a first side surface camera, the first side surface camera is located at an outside of the rotary table and is higher than the workpiece in a direction perpendicular to the rotary table, the first side surface camera captures an image of the first side surface of the workpiece when the workpiece is rotated to the first side surface camera.

4. The detection device of claim 3, wherein the plurality of photographing devices include a second side surface photographing device, the image capture device of the second side surface photographing device is a second side surface camera, the second side surface camera is located at an inner side of the rotary table and is higher than the workpiece in a direction perpendicular to the rotary table, the second side surface camera captures an image of the second side surface of the workpiece facing a center of the rotary table when the workpiece is moved to the second side surface camera.

5. The detection device of claim 3, wherein the plurality of photographing devices include a third side surface photographing device, the image capture device of the third side surface photographing device is a third side surface camera, the third side surface camera is located at the outside of the rotary table and is higher than the workpiece in the direction perpendicular to the rotary table, the third side surface camera captures an image of the third side surface of the workpiece away from a center of the rotary table when the workpiece is moved to the third side surface camera.

6. The detection device of claim 3, wherein the plurality of photographing devices include a fourth side surface photographing device, the image capture device of the fourth side surface photographing device is a fourth side surface camera, the fourth side surface camera is located at the outside of the rotary table and is higher than the workpiece in the direction perpendicular to the rotary table, the fourth side surface camera captures an image of the fourth side surface of the workpiece when the workpiece is moved to the fourth side surface camera.

7. The detection device of claim 1, wherein the plurality of photographing devices include a top/bottom surface photographing device, the top/bottom surface photographing device is a top/bottom surface camera, the top/bottom surface camera is located above or below the rotary table, the top/bottom surface camera captures an image of a top or bottom surface of the workpiece when the workpiece is moved to the top/bottom surface camera.

8. The detection device of claim 7, wherein an orientation of the top/bottom surface camera is defined by a third offset angle and a fourth offset angle when the top/bottom surface camera captures the image of the top or bottom surface of the workpiece.

9. The detection device of claim 8, wherein the third offset angle is an angle between a normal direction of the top or bottom surface and an orthographic projection of an optical axis of the top/bottom surface camera in a first reference plane parallel to the rotation axis of the rotary table and perpendicular to the top or bottom surface.

10. The detection device of claim 9, wherein the fourth offset angle is an angle between the normal direction of the top or bottom surface and the orthographic projection of the optical axis of the top/bottom surface camera on a second reference plane parallel to the rotation axis of the rotary table, perpendicular to the top or bottom surface, and perpendicular to the first reference plane.

11. The detection device of claim 8, wherein the third offset angle and the fourth offset angle are no less than 0 degrees and no larger than 30 degrees.

12. The detection device of claim 1, wherein each of the photographing devices has a light source and a support, the light source provides illumination for the corresponding surface of the workpiece, and the light source and the image capture device are installed on the support.

13. The detection device of claim 12, wherein the supports of two adjacent photographing devices are independent of each other or connected with each other.

14. The detection device of claim 1, wherein the plurality of photographing devices are distributed within a half cycle of rotation of the rotary table.

15. A method for detecting a workpiece, comprising:
   providing the detection device of claim 1;
   placing the workpiece on the rotary table and rotating the rotary table so that the workpiece passes through the plurality of photographing devices in turn;
   capturing images of the side surfaces of the workpiece by the image capture devices of the plurality of photographing devices; and
   recording the first offset angle and the second offset angle while the image capture device captures the image of the corresponding side surface,
   wherein, when the workpiece is a cuboid, the method further comprises calculating the size of the corresponding side surface by the following formulas:

$$E1 = e1/\cos \alpha 1$$

wherein E1 is the length of one edge of the corresponding side surface, and e1 is the length of the image of the one edge, α1 is the first offset angle; and $$E2 = e2/\cos \alpha 2$$

wherein E2 is the length of the other edge adjacent to the one edge of the corresponding side surface, and e2 is the length of the image of the other edge, α2 is the second offset angle.

16. A detection device for detecting a workpiece with multiple surfaces, comprising:
a rotary table carrying the workpiece and moving the workpiece by rotation; and
a plurality of photographing devices arranged at a plurality of different positions around the rotary table, each photographing device has an image capture device capturing an image of a corresponding surface of the workpiece that is moved to the image capture device, an orientation of the image capture device is defined by a first offset angle and a second offset angle when the image capture device captures the image of the corresponding surface of the workpiece, the first offset angle is an angle between a normal direction of the corresponding surface and an orthographic projection of an optical axis of the image capture device on a plane perpendicular to a rotation axis of the rotary table, the second offset angle is an angle between the normal direction of the corresponding surface and an orthographic projection of the optical axis of the image capture device on a plane parallel to the rotation axis of the rotary table and perpendicular to the corresponding surface, the plurality of photographing devices including:
a first side surface photographing device located at an outer side of the rotary table and arranged higher than the workpiece in a direction perpendicular to the rotary table, the first side surface photographing device capturing an image of a first side surface of the workpiece when the workpiece is rotated to the first side surface photographing device;
a second side surface photographing device located at an inner side of the rotary table and arranged higher than the workpiece in a direction perpendicular to the rotary table, the second side surface photographing device capturing an image of a second side surface of the workpiece facing a center of the rotary table when the workpiece is moved to the second side surface photographing device;
a third side surface photographing device located at the outer side of the rotary table and arranged higher than the workpiece in the direction perpendicular to the rotary table, the third side surface photographing device capturing an image of a third side surface of the workpiece away from a center of the rotary table when the workpiece is moved to the third side surface photographing device, the second side surface and the third side surface are opposite to each other in a radial direction of the rotary table; and
a fourth side surface photographing device located at the outer side of the rotary table and arranged higher than the workpiece in the direction perpendicular to the rotary table, the fourth side surface photographing device capturing an image of a fourth side surface of the workpiece when the workpiece is moved to the fourth side surface photographing device, first side surface and the fourth side surface are opposite to each other in a rotation direction of the rotary table.

17. The detection device of claim 16, wherein the first offset angle and the second offset angle are no less than 0 degrees and no larger than 30 degrees.

18. The detection device of claim 16, wherein:
the first side surface photographing device faces in a first at least partially radially inward direction relative to a center of the rotary table;
the second side surface photographing device faces in a radially outward direction relative to the center of the rotary table;
third side surface photographing device faces in a radially inward direction relative to the center of the rotary table; and
the fourth side surface photographing device faces in a second at least partially radially inward direction relative to the center of the rotary table.

19. The detection device of claim 18, wherein:
the first offset angle and the second offset angle of the first side surface photographing device are each greater than 0 degrees and less than or equal to 30 degrees;
the first offset angle and the second offset angle of the second side surface photographing device are 0 degrees, and greater than 0 degrees and less than or equal to 30 degrees, respectively;
the first offset angle and the second offset angle of the third side surface photographing device are 0 degrees, and greater than 0 degrees and less than or equal to 30 degrees, respectively; and
the first offset angle and the second offset angle of the fourth side surface photographing device are each greater than 0 degrees and less than or equal to 30 degrees.

20. The detection device of claim 16, wherein:
the plurality of photographing devices are adapted to capture images of corresponding ones of the side surfaces of the workpiece; and
the detection device is adapted to record the first offset angle and the second offset angle while the plurality of photographing devices capture the images of the corresponding side surfaces, wherein, when the workpiece is a cuboid, the detection device is further adapted to calculate a size of the corresponding side surface by the following formulas:

$$E1 = e1/\cos \alpha 1$$

wherein E1 is the length of one edge of the corresponding side surface, and e1 is the length of the image of the one edge, α1 is the first offset angle; and $$E2 = e2/\cos \alpha 2$$

wherein E2 is the length of the other edge adjacent to the one edge of the corresponding side surface, and e2 is the length of the image of the other edge, α2 is the second offset angle.

* * * * *